United States Patent
Lin et al.

(10) Patent No.: US 9,616,567 B2
(45) Date of Patent: *Apr. 11, 2017

(54) ROBOTIC HAND, METHOD FOR MAKING THE SAME, AND ROBOT HAVING THE SAME

(71) Applicant: HON HAI PRECISION INDUSTRY CO., LTD., New Taipei (TW)

(72) Inventors: Yi-Cheng Lin, New Taipei (TW); Shih-Pin Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,130

(22) Filed: Jun. 26, 2015

(65) Prior Publication Data
US 2016/0229054 A1    Aug. 11, 2016

(30) Foreign Application Priority Data

Feb. 6, 2015 (CN) .......................... 2015 1 0062773

(51) Int. Cl.
G05B 15/00 (2006.01)
G05B 19/00 (2006.01)
B25J 9/16 (2006.01)
B25J 13/08 (2006.01)

(52) U.S. Cl.
CPC .......... *B25J 9/1612* (2013.01); *B25J 9/1697* (2013.01); *B25J 13/084* (2013.01); *Y10S 901/30* (2013.01); *Y10S 901/47* (2013.01)

(58) Field of Classification Search
None
See application file for complete search history.

(56) References Cited

U.S. PATENT DOCUMENTS

| 4,641,251 A * | 2/1987 | Inoue | B25J 9/0081 180/8.6 |
|---|---|---|---|
| 4,654,949 A * | 4/1987 | Pryor | A01B 69/008 29/407.04 |
| 5,744,728 A * | 4/1998 | Suita | B25J 19/063 73/862.542 |
| 8,286,528 B2 * | 10/2012 | Fujioka | B25J 9/102 74/490.01 |
| 2008/0161970 A1 * | 7/2008 | Adachi | B25J 9/0003 700/253 |
| 2009/0173560 A1 * | 7/2009 | Nakamoto | B25J 5/00 180/167 |
| 2010/0139437 A1 * | 6/2010 | Ichikawa | B25J 9/1612 74/490.05 |
| 2010/0191372 A1 * | 7/2010 | Nihei | B25J 9/1676 700/245 |

* cited by examiner

*Primary Examiner* — Bhavesh V Amin
(74) *Attorney, Agent, or Firm* — Zhigang Ma

(57) ABSTRACT

A robotic hand includes an interior casing, a cladding layer wrapped around the interior casing, a plurality of pressure sensors, and a controller. The pressure sensors are located at different locations on an exterior surface of the interior casing, and are wrapped by the cladding layer. The pressure sensors can sense pressure at different locations on the exterior surface of the interior casing, and generate corresponding electrical signals. The controller can obtain the generated electrical signals, and generate a control signal according to the obtained electrical signals causing the robot to generate feedback.

15 Claims, 6 Drawing Sheets

ROBOTIC HAND, METHOD FOR MAKING THE SAME, AND ROBOT HAVING THE SAME

This application is related to co-pending U.S. patent application entitled, "ROBOTIC HAND, METHOD FOR MAKING THE SAME, AND ROBOT HAVING THE SAME", filed Jun. 26, 2015 Ser. No. 14/752,080. The application has the same assignee as the present application. The above-identified application is incorporated herein by reference.

FIELD

The subject matter herein generally relates to a robotic hand, a method for making the robotic hand, and a robot having the robotic hand.

BACKGROUND

Robots are increasingly being employed in tasks that are otherwise dangerous or tedious for humans. The ability of a robot can be increased when tactile sensors are incorporated into the robotic hands to enable the robot to "feel" objects in robotic hand and to generate corresponding feedback.

BRIEF DESCRIPTION OF THE DRAWINGS

Implementations of the present technology will now be described, by way of example only, with reference to the attached figures.

DETAILED DESCRIPTION

Figure 1:
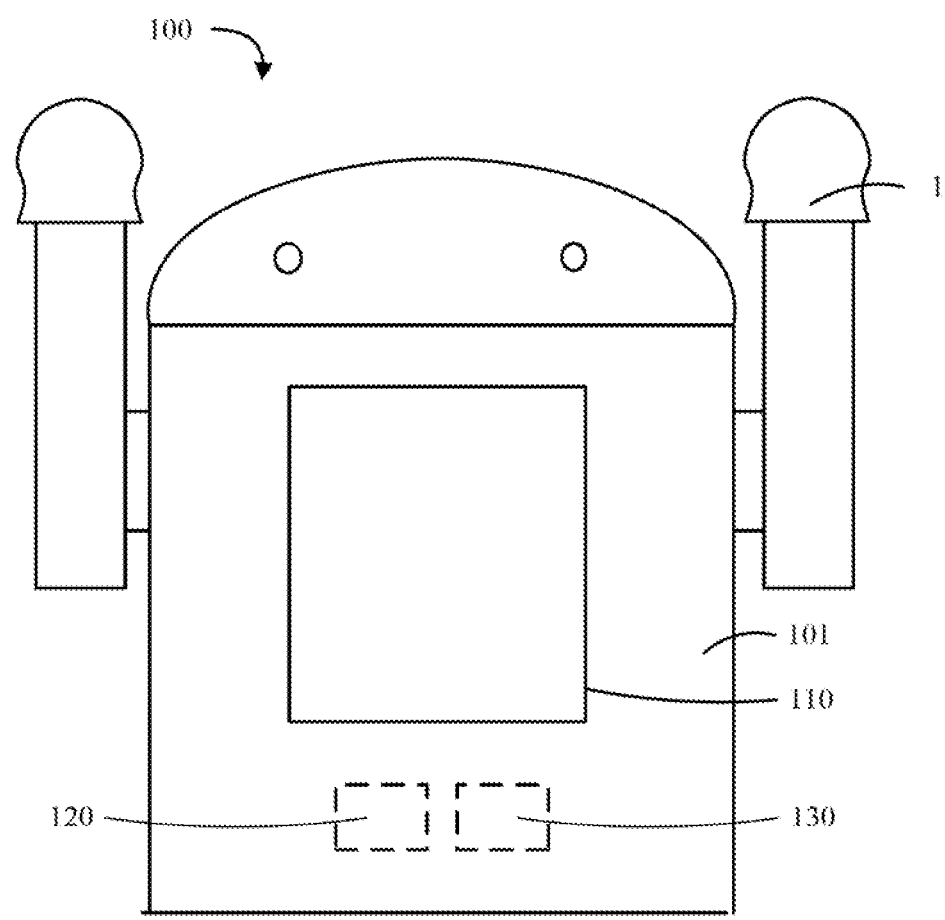
FIG. 1 is a diagrammatic view of an embodiment of a robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a robot 100 including a body 101 and two robotic hands 1 secured to two opposite sides of the body 101.

Figure 2:
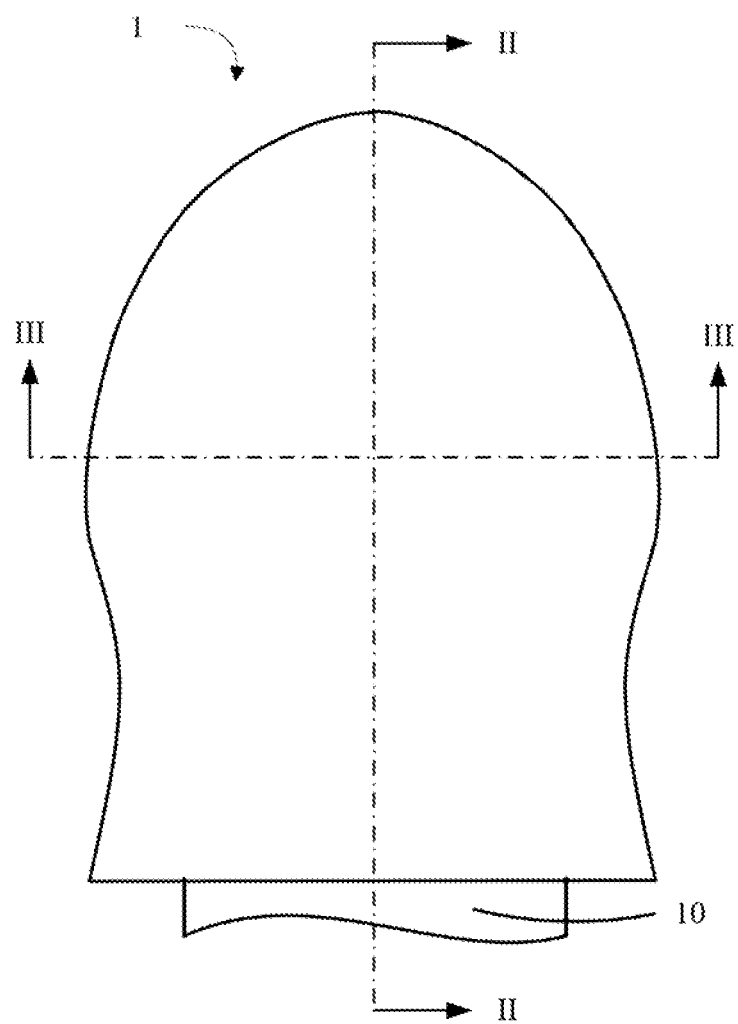
FIG. 2 is a sectional perspective view of a robotic hand included in the robot of FIG. 1.
Figure 3:
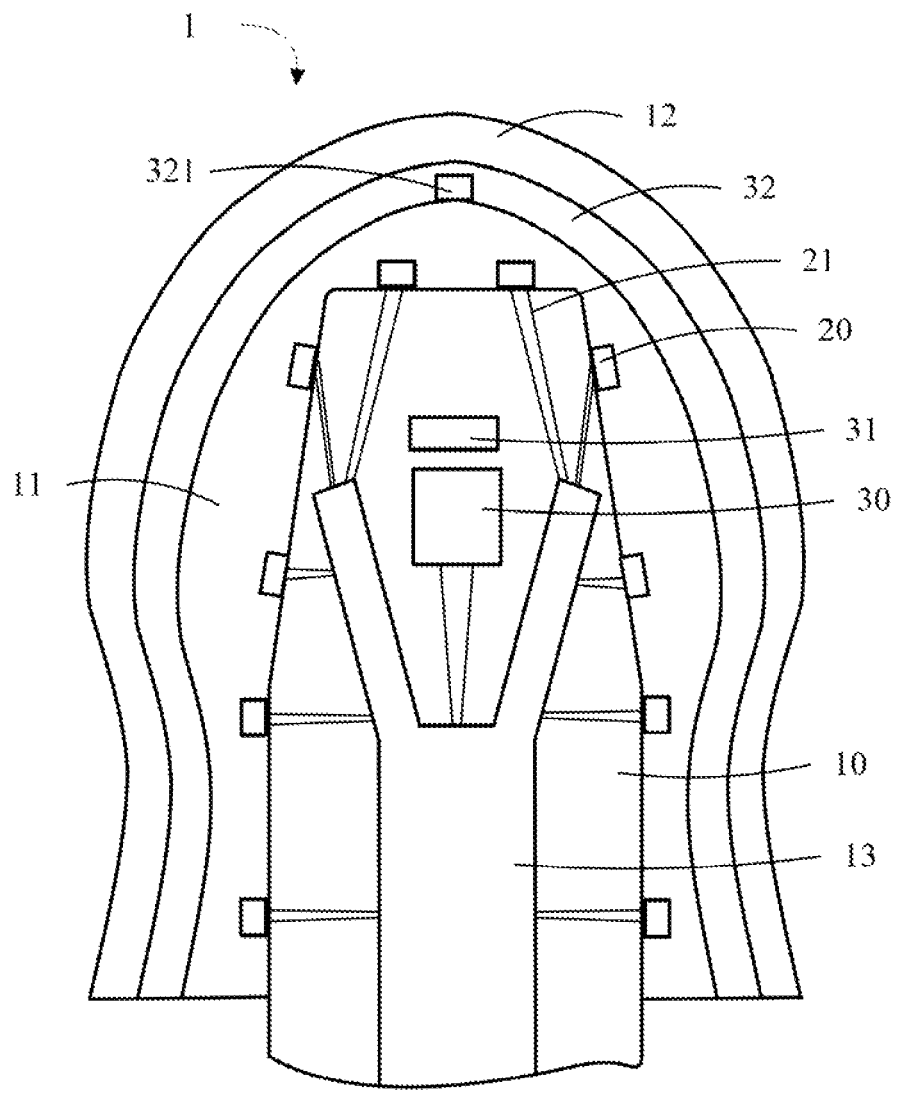
FIG. 3 is a cross-sectional view taken along line II-II of FIG. 2.
Figure 4:
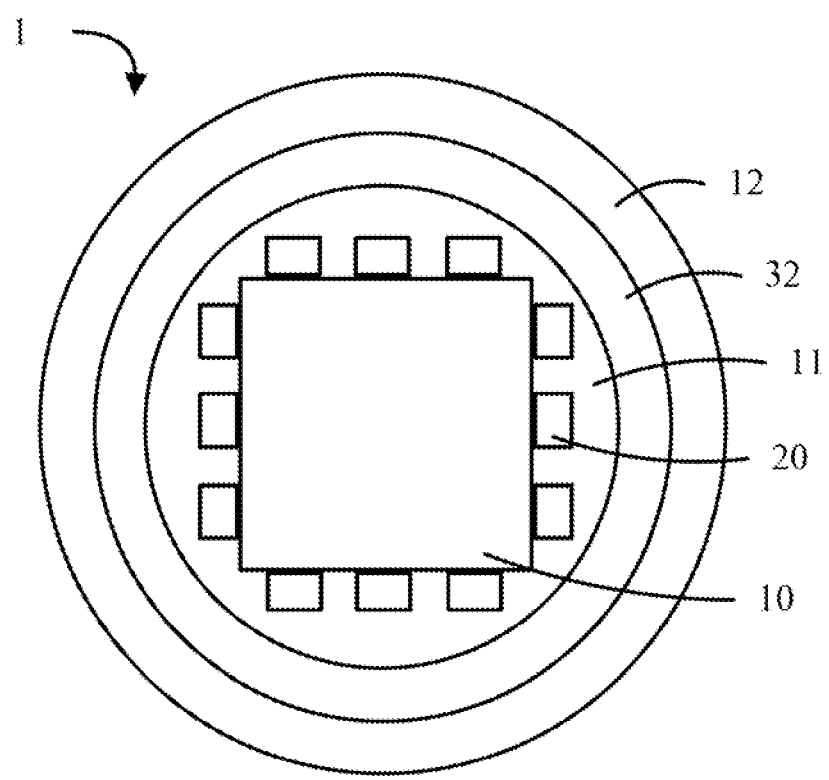
FIG. 4 is a cross-sectional view taken along line III-III of FIG. 2.

FIG. 2 illustrates that each robotic hand 1 includes an interior casing 10. FIG. 3 illustrates that each robotic hand 1 further includes a cladding layer 11, a number of pressure sensors 20, and a controller 30. Also referring to FIG. 4, the cladding layer 11 is wrapped around an exterior surface of an end of the interior casing 10, and is made of elastic resin such as rubber or polyurethane. The pressure sensors 20 are located at different locations on the exterior surface of the interior casing 10, and are wrapped by the cladding layer 11. When an original pressure is applied to the robotic sensor 1, such original pressure will be delivered from the cladding layer 11 to at least one pressure sensor 20, and then sensed by the at least one pressure sensor 20. The pressure sensors 20 sense pressure at different locations on the exterior surface of the interior casing 10, and generate electrical signals accordingly. The controller 30 is located inside the interior casing 10, and is electrically connected to each of the pressure sensors 20. The controller 30 obtains the generated electrical signals, and generates a control signal according to the obtained electrical signals. The control signal is able to cause the robot 100 to generate feedback.

Since the pressure sensors 20 are wrapped by the cladding layer 11, the cladding layer 11 may absorb a portion of the original pressure to cause the pressure sensed by the pressure sensors 20 to be less than the original pressure. In at least one embodiment, the elastic resin of the wrapped layer 11 has a moderate elasticity. As such, the robotic hand 1 can have enough elasticity to effectively reflect the amount of the original pressure. That is, the robotic hand 1 can effectively deliver the original pressure to the pressure sensors 20, to cause the amount of the pressure sensed by the pressure sensors 20 to be nearly identical to the original pressure.

Figure 5:
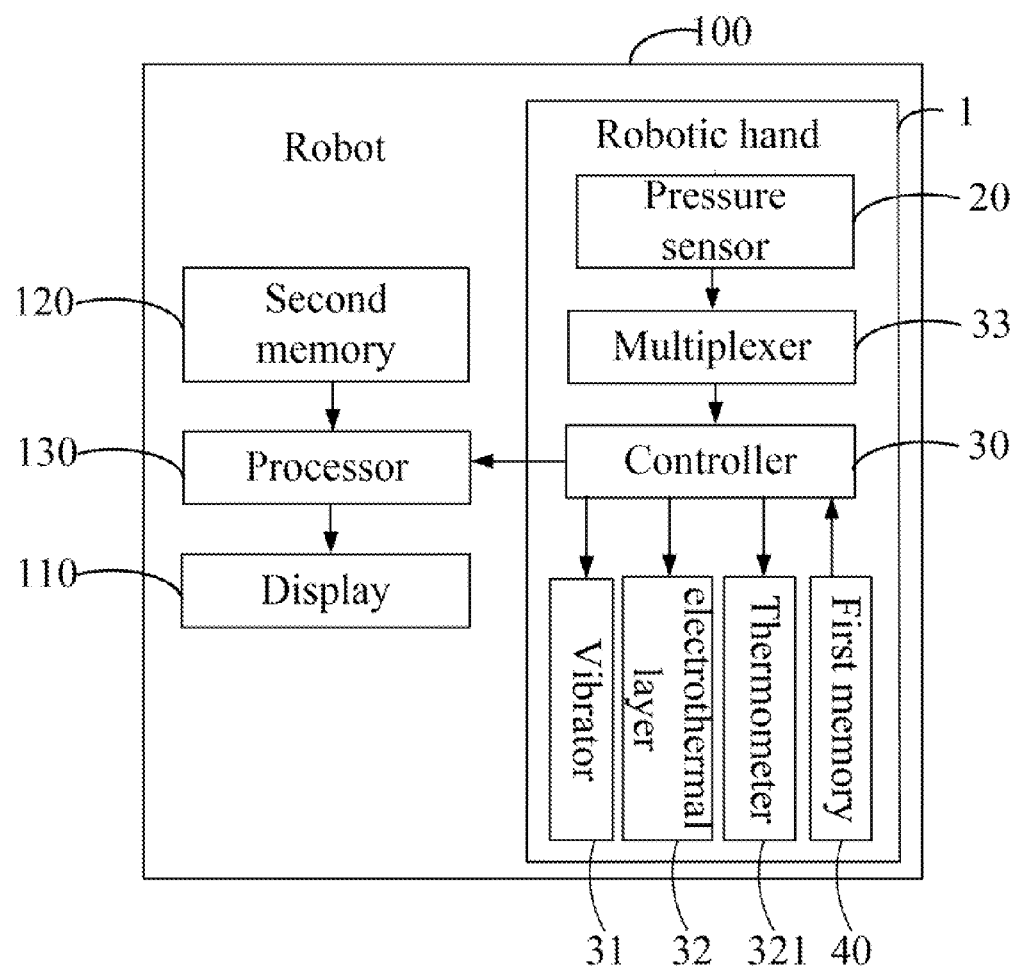
FIG. 5 is a block diagram of the robotic hand of FIG. 2.

In at least one embodiment, the pressure sensors 20 can be piezoelectric sensors or piezoresistance sensors which can generate voltage signals after sensing the pressure applied. A value of voltage signals is proportional to the sensed pressure. FIG. 5 illustrates that each robotic hand 1 further includes a first memory 40 for storing different feedback data, and a first relationship between values of voltage signals and the feedback data. Each feedback data corresponds to one value of voltage signals. In at least one embodiment, the value of voltage signals is proportional to the feedback data. That is, the greater the value of voltage signals is, the greater the feedback data is (the stronger feedback is). The controller 30 determines a feedback data corresponding to the value of voltage signals according to the stored first relationship, and generates the control signal according to the determined feedback data, thereby controlling the robot 100 to generate feedback with the feedback data.

In at least one embodiment, the feedback generated by the robot 100 is vibration feedback. In this embodiment, the feedback data is a vibration data, such amplitude or frequency of the vibration feedback. In detail, the robotic hand 1 further includes a vibrator 31 (shown in FIGS. 3 and 5) located in the interior casing 10 and electrically connected to the controller 30. The controller 30 determines a vibration data corresponding to the value of voltage signals according to the stored first relationship, generates the control signal according to the determined vibration data. The control signal is able to cause the vibrator 31 to vibrate according to the determined vibration data, thereby allowing the robot 100 to generate the vibration feedback.

In another embodiment, the feedback generated by the robot 100 is temperature feedback. In this embodiment, the feedback data is a temperature value. In detail, the robotic hand 1 further includes an electrothermal layer 32 cladding around an exterior surface of the cladding layer 11. The electrothermal layer 32 is made of electrothermal polymer such as polyimide. The controller 30 determines a temperature value corresponding to the value of voltage signals according to the stored first relationship, generates the control signal according to the determined temperature value. The control signal is able to cause the electrothermal layer 32 to heat to the determined temperature value, thereby allowing the robot 100 to generate the temperature feedback. However, the controller 30 can also control the electrothermal layer 32 to heat according to an ambient temperature of an environment in which the robotic hand 1 is located, other than heating according to the value of voltage signals applied to the robotic hand 1. In this embodiment, the robotic hand 1 further includes a thermometer 321 located in the electrothermal layer 32. The thermometer 321 senses an ambient temperature value of the environment. The controller 30 obtains the sensed ambient temperature value from the thermometer 321, compares the obtained ambient temperature value with a preset value, and generates the control signal when the obtained ambient temperature value is greater than the preset value. The control signal is able to cause the electrothermal layer 32 to heat, thereby allowing the robot 100 to generate the temperature feedback.

In yet another embodiment, the feedback generated by the robot 100 is based on emotion displayed in pictures. In this embodiment, the robot 100 further includes a display screen 110 (shown in FIGS. 1 and 6) secured to a front surface of the body 101, and a second memory 120 and a processor 130 (shown in FIGS. 1 and 6) located in the body 101. The second memory 120 stores a number of pictures having associated emotion classifications, and a second relationship between the values of voltage signals and the pictures. Each picture corresponds to one value of voltage signal. In the embodiment, the greater the value of voltage signal, the stronger the emotion expressed by the corresponding picture. The processor 130 is electrically connected to the controller 30. The processor 130 obtains the value of voltage signals from the controller 30, determines a picture corresponding to the obtained value of voltage signals according to the stored second relationship, and controls the display screen 110 to display the determined picture, thereby allowing the robot 100 to generate feedback based on emotion displayed in pictures.

In yet another embodiment, the feedback generated by the robot 100 includes at least two of the vibration feedback, the temperature feedback, and the feedback based on emotion displayed in pictures. In this embodiment, the robotic hand 1 further includes a multiplexer 33 (shown in FIG. 6) located in the interior casing 10. The controller 30 is electrically connected to the pressure sensors 20 via the multiplexer 33. The multiplexer 33 includes a number of sub-channels (not shown) each connected to one pressure sensor 20. The multiplexer 33 scans the sub-channels to obtain the electrical signals from at least one pressure sensor 20 via the corresponding sub-channel. The controller 30 obtains the electrical signals from the multiplexer 33, and generates the control signal according to the obtained electrical signals. The control signal is able to cause the robot 100 to generate at least two of the vibration feedback, the temperature feedback, and the feedback based on emotion displayed in pictures.

In at least one embodiment, the interior casing 10 is polyhedral-shaped. The pressure sensors 20 are secured to different surfaces of the interior casing 10. The robotic hand 1 further includes a protective layer 12 wrapped around an exterior surface of the electrothermal layer 32. The protective layer 12 is made of elastic resin such as rubber. The interior casing 10 further defines a number of through holes (not shown) to allow wires 21 (shown in FIG. 3) connecting the controller 30 and the pressure sensors 20 to pass through. The robotic hand 1 further includes a positioning member 13 (shown in FIG. 3) located in the interior casing 10. The wires 21 of the pressure sensors 20 can pass through different locations of the positioning member 13 and are then connected to the controller 30, thereby preventing the wires 21 from being disorderly.

Figure 6:
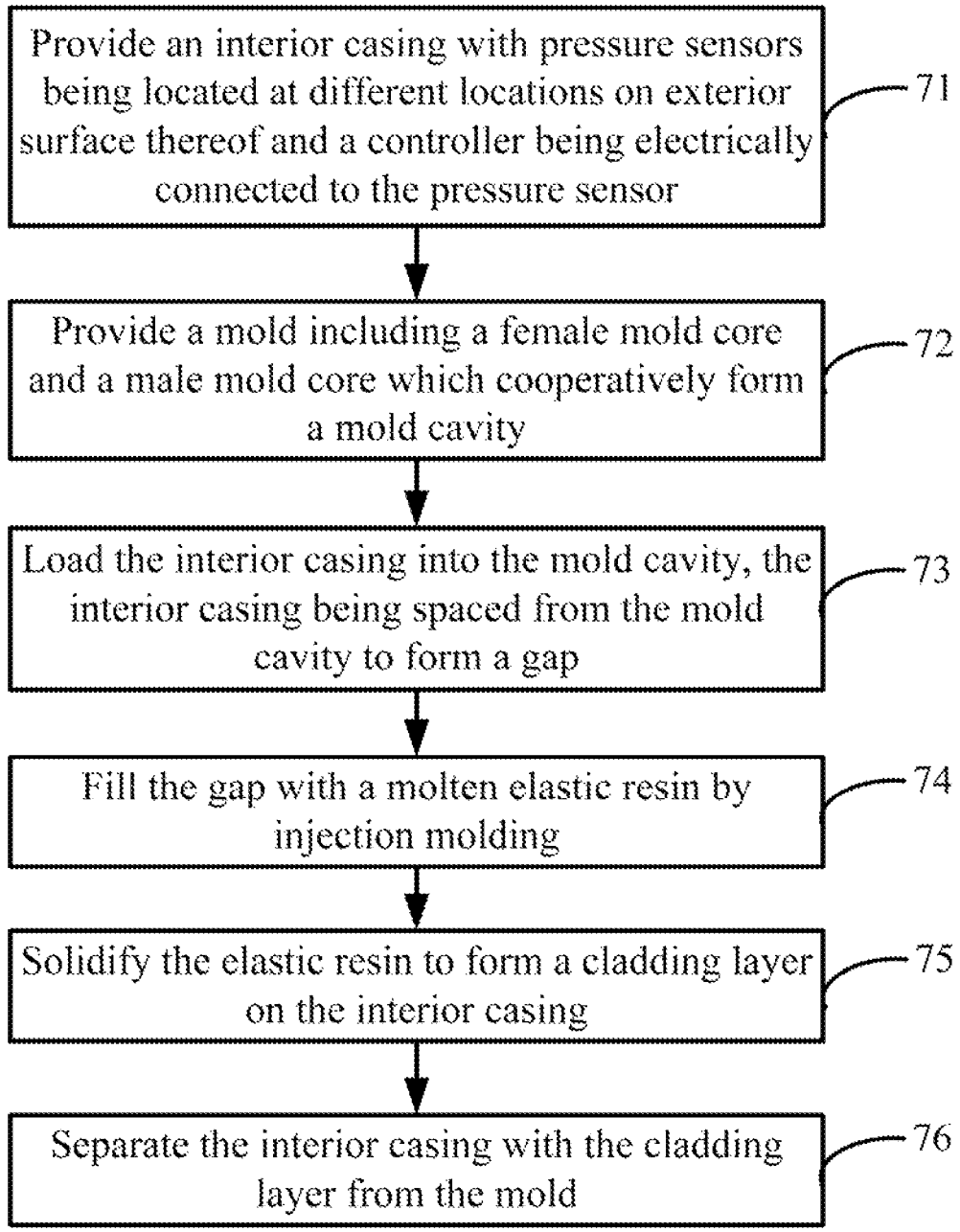
FIG. 6 is a flowchart of an embodiment of a method for making a robotic hand.

Referring to FIG. 6, a flowchart for making a robotic hand 1 is presented in accordance with an example embodiment which is being thus illustrated. The example method for making the robotic hand 1 is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 61.

At block 61, an interior casing 10 is provided. A number of pressure sensors 20 are located at different locations on the exterior surface of the interior casing 10. A controller 30 is located inside the interior casing 10, and is electrically connected to each of the pressure sensors 20. The pressure sensors 20 can sense pressure at different locations on the exterior surface of the interior casing 10, and generate electrical signals accordingly. The controller 30 can obtain the generated electrical signals, and generate a control signal according to the obtained electrical signals. The control signal is able to cause the robot 100 to generate feedback.

At block 62, a mold (not shown) including a female mold core and a male mold core is provided. The female mold core and the male mold core cooperatively define a mold cavity.

At block 63, the interior casing 10 is loaded into the mold cavity, and is spaced from interior surfaces of the mold cavity to define a gap.

At block 64, the gap is filled with a molten elastic resin by injection molding. The elastic resin can be rubber or polyurethane.

At block 65, the elastic resin is solidified to form a cladding layer 11 on the exterior surface of the interior casing 10, to cause the pressure sensors 20 to be wrapped by the cladding layer 11.

At block 66, the interior casing 10 with the cladding layer 11 is separated from the mold. Thus, the robotic hand 1 is obtained. In at least one embodiment, this can be further followed by wrapping an electrothermal layer 32 around an exterior surface of the wrapping layer 11, and wrapping a protective layer 12 around an exterior surface of the electrothermal layer 32. The electrothermal layer 32 is made of electrothermal polymer such as polyimide. The protective layer 12 is made of elastic material such as rubber. The electrothermal layer 32 and the protective layer 12 can also be formed by injection molding.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A robotic hand comprising:
an interior casing;
a cladding layer wrapped around an exterior surface of an end of the interior casing, the cladding layer made of elastic resin;
a plurality of pressure sensors located at different locations on the exterior surface of the interior casing, the plurality of pressure sensors wrapped by the cladding layer and configured to sense pressure at the different locations on the exterior surface of the interior casing, and generate electrical signals accordingly; and
a controller located inside the interior casing and electrically connected to each on of the plurality of pressure sensors, the controller configured to obtain the generated electrical signals, and generate a control signal according to the obtained electrical signals, the control signal causing a robot to generate feedback;
wherein the pressure sensors are configured to generate voltage signals after sensing the pressure applied; a value of voltage signals is proportional to the sensed pressure; the controller is configured to determine a feedback data corresponding to a value of voltage signals, and generate the control signal according to the determined feedback data, thereby controlling the robot to generate feedback with the feedback data; and
wherein the robotic hand further comprises a first memory, wherein the first memory is configured to store different feedback data, and a first relationship between values of voltage signals and the feedback data; each feedback data corresponds to one value of voltage signals; the controller is configured to determine a feedback data corresponding to the value of voltage signals according to the stored first relationship.

2. The robotic hand of claim 1, further comprising a vibrator, wherein the feedback generated by the robot is vibration feedback; the feedback data is a vibration data; the vibrator is located in the interior casing and electrically connected to the controller; the controller is configured to determine a vibration data corresponding to the value of voltage signals according to the stored first relationship, and generate the control signal according to the determined vibration data; the control signal is able to cause the vibrator to vibrate according to the determined vibration data, thereby allowing the robot to generate the vibration feedback.

3. The robotic hand of claim 2, wherein the vibration data is an amplitude or a frequency of the vibration feedback.

4. The robotic hand of claim 1, further comprising an electrothermal layer, wherein the feedback generated by the robot is temperature feedback; the feedback data is a temperature value; the electrothermal layer is cladding around an exterior surface of the cladding layer; the controller is configured to determine a temperature value corresponding to the value of voltage signals according to the stored first relationship, and generate the control signal according to the determined temperature value; the control signal is able to cause the electrothermal layer to heat to the determined temperature value, thereby allowing the robot to generate the temperature feedback.

5. The robotic hand of claim 4, further comprising a protective layer wrapped around an exterior surface of the electrothermal layer.

6. The robotic hand of claim 1, further comprising an electrothermal layer and a thermometer, wherein the feedback generated by the robot is temperature feedback; the electrothermal layer is cladding around an exterior surface of the cladding layer; the thermometer is located in the electrothermal layer, and is configured to sense an ambient temperature value of an environment in which the robotic hand is located; the controller is configured to obtain the sensed ambient temperature value from the thermometer, compare the obtained ambient temperature value with a preset value, and generate the control signal when the obtained ambient temperature value is greater than the preset value; the control signal is able to cause the electrothermal layer to heat, thereby allowing the robot to generate the temperature feedback.

7. The robotic hand of claim 1, wherein the interior casing is polyhedral-shaped; the pressure sensors are secured to different surfaces of the interior casing.

8. The robotic hand of claim 1, further comprising a positioning member, wherein the positioning member is located in the interior casing; wires connecting the pressure sensors and the controller pass through different locations of the positioning member.

9. A robot comprising:
a body; and
two robotic hands secured to two opposite sides of the body, each robotic hand comprising:
an interior casing;
a cladding layer wrapped around an exterior surface of an end of the interior casing, the cladding layer made of elastic resin;
a plurality of pressure sensors located at different locations on the exterior surface of the interior casing, the plurality of pressure sensors wrapped by the cladding layer and configured to sense pressure at the different locations on the exterior surface of the interior casing, and generate electrical signals accordingly; and
a controller located inside the interior casing and electrically connected to each one of the plurality of pressure sensors, the controller configured to obtain the generated electrical signals, and generate a control signal according to the obtained electrical signals, the control signal causing the robot to generate feedback;
wherein the pressure sensors are configured to generate voltage signals after sensing the pressure applied; a value of voltage signals is proportional to the sensed pressure; the controller is configured to determine a feedback data corresponding to a value of voltage signals, and generate the control signal according to the determined feedback data, thereby controlling the robot to generate the feedback with the feedback data.

10. The robot of claim 9, wherein the robotic hand further comprises a first memory for storing different feedback data, and a first relationship between values of voltage signals and feedback data; each feedback data corresponds to one value of voltage signals; the controller is configured to determine a feedback data corresponding to the value of voltage signals according to the stored first relationship.

11. The robot of claim 10, wherein the feedback generated by the robot is vibration feedback; the feedback data is a vibration data; the robotic hand further comprises a vibrator located in the interior casing and electrically connected to the controller; the controller is configured to determine a vibration data corresponding to the value of voltage signals according to the stored first relationship, and generate the control signal according to the determined vibration data; the control signal is able to cause the vibrator to vibrate according to the determined vibration data, thereby allowing the robot to generate the vibration feedback.

12. The robot of claim 10, wherein the feedback generated by the robot is temperature feedback; the feedback data is a temperature value; the robotic hand further comprises an electrothermal layer cladding around an exterior surface of the cladding layer; the controller is configured to determine a temperature value corresponding to the value of voltage signals according to the stored first relationship, and generate the control signal according to the determined temperature value; the control signal is controllable to cause the electrothermal layer to heat to the determined temperature value, thereby allowing the robot to generate the temperature feedback.

13. The robot of claim 9, further comprising a display screen, a second memory, and a processor, wherein the feedback generated by the robot is based on emotion displayed in pictures; the display screen is secured to a front surface of the body; the second memory and the processor are located in the body; the second memory is configured to store a plurality of pictures having associated emotion classifications, and a second relationship between values of voltage signals and the emotional pictures; each picture corresponds to one value of voltage signals; the processor is electrically connected to the controller, and is configured to obtain the value of voltage signals from the controller, determine a picture corresponding to the obtained value of voltage signals according to the stored second relationship, and control the display screen to display the determined picture, thereby allowing the robot to generate the feedback based on emotion displayed in pictures.

14. The robot of claim 9, wherein the robotic hand further includes a multiplexer located in the interior casing; the controller is electrically connected to the pressure sensors via the multiplexer; the multiplexer is configured to obtain the electrical signals from at least one pressure sensor via a corresponding sub-channel; the controller is configured to obtain the electrical signals from the multiplexer, and generate the control signal according to the obtained electrical signals.

15. A method for making a robotic hand comprising:
providing an interior casing, a number of pressure sensors being located at different locations on the exterior surface of the interior casing, a controller being located inside the interior casing and electrically connected to each of the plurality of pressure sensors, the plurality of pressure sensors being configured to sense pressure at locations on the exterior surface of the interior casing and generate electrical signals accordingly, the controller being configured to obtain the generated electrical signals, and generate a control signal according to the obtained electrical signals, the control signal causing a robot to generate feedback;
providing a mold including a female mold core and a male mold core, the female mold core and the male mold core cooperatively defining a mold cavity;
loading the interior casing into the mold cavity, the interior casing being spaced from interior surfaces of the mold cavity to define a gap;
filling the gap with a molten elastic resin by injection molding;
solidifying the elastic resin to form a cladding layer on the exterior surface of the interior casing, to cause the pressure sensors to be wrapped by the cladding layer; and
separating the interior casing with the cladding layer from the mold, to obtain the robotic hand.

\* \* \* \* \*